UNITED STATES PATENT OFFICE.

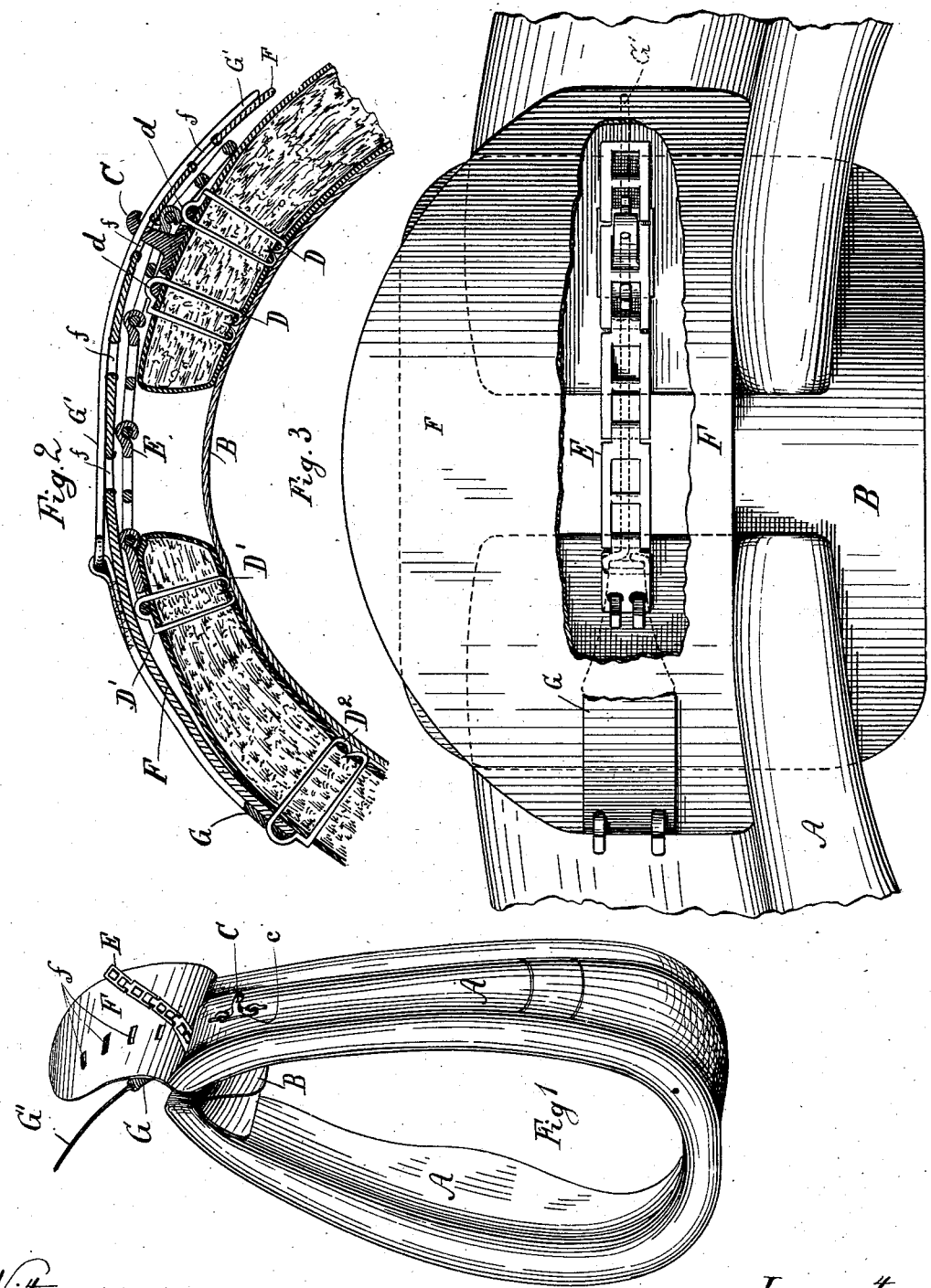

FRAZIER W. NEVIUS, OF DECATUR, ILLINOIS.

HORSE-COLLAR.

SPECIFICATION forming part of Letters Patent No. 292,843, dated February 5, 1884.

Application filed July 5, 1883. (No model.)

*To all whom it may concern:*

Be it known that I, FRAZIER W. NEVIUS, a citizen of the United States, residing at Decatur, in the county of Macon and State of Illinois, have invented certain new and useful Improvements in Horse-Collars, of which I do declare the following to be a full, clear, and exact description, reference being had to the accompanying drawings, forming part of this specification.

My present invention has for its object to provide for open-ended horse-collars an improved construction of fastening, which shall be simple, cheap, and durable, can be quickly operated, and will allow the collar to be readily adjusted to suit necks of different sizes. This object I have accomplished by the construction hereinafter described, illustrated in the accompanying drawings, and particularly defined in the claims at the end of the specification.

Figure 1 is a perspective view of a collar embodying my improvements. Fig. 2 is an enlarged view in central longitudinal section of the upper portion of the collar and fastening; and Fig. 3 is a plan view of the upper portion of the collar and its fastening, parts being broken away for the purpose of better illustration.

A designates an open-ended collar of usual construction, to the inner side of one end of which is attached the flap or shield B, which, when the collar is in position for use, extends across the opening between its ends.

To the body or pad portion of the collar, near one of its ends, is attached the hook C, which is secured in position by means of the staples D, passing through suitable eyes in the enlarged base $c$ of the hook, and entirely through the collar, upon the under side of which the ends of staples are clinched, as clearly shown in Fig. 2. The upper portions of the staples D are furnished with enlargements $d$, in which snugly fit portions of the hook-base $c$ in such manner as to securely guard against the hook becoming loose.

To the end of the collar opposite that carrying the hook C is secured, by staples, D′ the metallic hook-chain E, which is composed, preferably, of a series of flat links having openings $e$, in which the hook will rest when the chain is slipped over it. To the end of the collar opposite the hook is also attached, by staples $D^2$, the housing F, having a series of eyes or openings, $f$, through which the end of the hook C will project, and above this housing, and also held by the staples $D^2$, is the strip G, carrying at its end the guard-wire G′, which passes through a perforation in the hook C when the latter has been inserted through the hook-chain and the housing, and effectually prevents the withdrawal of the hook. The staples D D′ $D^2$, secured to the collar as shown, not only serve to retain the several parts of the fastening firmly in place, but have, furthermore, the important function of clamping the ends of the collar in such manner as to avoid in great measure the tendency of the short straw with which collars are usually stuffed to break through the ends of the collar.

From the above construction it will be seen that the collar can be readily fastened to the horse's neck by simply slipping the hook-chain and the housing over the hook and inserting the guard-wire through its end. The several openings in the chain-links and the housing allow the collar to be properly adjusted to suit necks of different sizes.

The hook-chain E, the housing F, and the strip G might, if desired, be connected to the collar by the same staples, although I prefer the construction shown.

The hook-chain, I have found, makes a much more secure fastening than is possible where the ends of the collar are connected by passing the hook through perforations in the housing, as in such construction there is danger of distorting or breaking the eyes or openings of the housing, which, after long wear and exposure, may become too weak to bear the strain.

By my present improvement, the strain being borne entirely by the chain, a more secure connection of the collar ends is made and a longer service of the housing is obtained.

Having thus described my invention, what I claim as new, and desire to secure by Letters Patent, is—

1. In a horse-collar, the combination, with the hook C and chain E, of the staples holding said hook and chain, and passing through the ends of the collar, substantially as described.

2. In a horse-collar, the combination of the hook, the hook-chain, and the housing having openings for the hook, substantially as described.

3. In a horse-collar, the combination of the broad hook C, the flat hook-chain E, the housing F, the strip G, and guard-wire G', the several parts being connected with the collar by means of staples passing through the ends of the collar and clinched upon its under side, substantially as described.

In testimony whereof I have hereunto set my hand this 3d day of July, A. D. 1883.

FRAZIER W. NEVIUS.

In presence of—
GEO. P. FISHER, Jr.,
JAMES H. PEIRCE.